(12) United States Patent
Biskop

(10) Patent No.: US 11,167,471 B2
(45) Date of Patent: Nov. 9, 2021

(54) DUPLEX PRINTING OF THREE-DIMENSIONAL STRUCTURES WITH ADJUSTABLE DEFORMATION CONTROL

(71) Applicant: LUXEXCEL HOLDING B.V., Eindhoven (NL)

(72) Inventor: Joris Biskop, Vlissingen (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 310 days.

(21) Appl. No.: 16/030,966

(22) Filed: Jul. 10, 2018

(65) Prior Publication Data
US 2019/0009456 A1 Jan. 10, 2019

(30) Foreign Application Priority Data
Jul. 10, 2017 (EP) .................................. 17180621

(51) Int. Cl.
*B29C 64/112* (2017.01)
*B33Y 10/00* (2015.01)
(Continued)

(52) U.S. Cl.
CPC .......... *B29C 64/112* (2017.08); *B29C 64/245* (2017.08); *B29C 64/40* (2017.08);
(Continued)

(58) Field of Classification Search
None
See application file for complete search history.

(56) References Cited

U.S. PATENT DOCUMENTS

2002/0079611 A1* 6/2002 Ellison .................... B29C 51/38
  264/247
2003/0198705 A1* 10/2003 Foreman .......... B29D 11/00442
  425/174.4
(Continued)

FOREIGN PATENT DOCUMENTS

| DE | 102014004870 A1 * | 4/2014 | ............. B22F 3/002 |
| DE | 102014004870 A1 | 10/2015 | |
| WO | 2013167528 A1 | 11/2013 | |

OTHER PUBLICATIONS

Extended European Search Report for European Application No. 17180621.9; dated Jan. 25, 2018.
(Continued)

*Primary Examiner* — Matthew J Daniels
*Assistant Examiner* — Gregory C. Grosso
(74) *Attorney, Agent, or Firm* — The Dobrusin Law Firm, P.C.

(57) ABSTRACT

A method for printing a three-dimensional structure by depositing droplets of printing ink at least partially side by side and one above the other, including steps of: depositing droplets of printing ink in a first printing step in order to build up an intermediate first pre-structure, depositing droplets of printing ink in a second printing step in order to build up an intermediate second pre-structure on at least one side of the first pre-structure, rotating the first pre-structure and arranging the first pre-structure on a support structure in a rearrangement step between the first and the second printing step, where the support structure includes a carrier substructure and a deformation-control substructure, and where the deformation-control substructure comprises a pressure chamber. The present teachings further relate to a corresponding duplex printed three-dimensional structure and a duplex printer.

14 Claims, 2 Drawing Sheets

Figure 1:
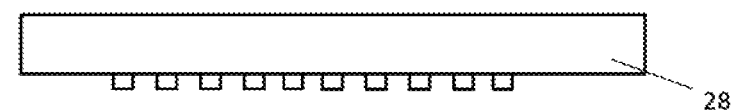
Figure 1:
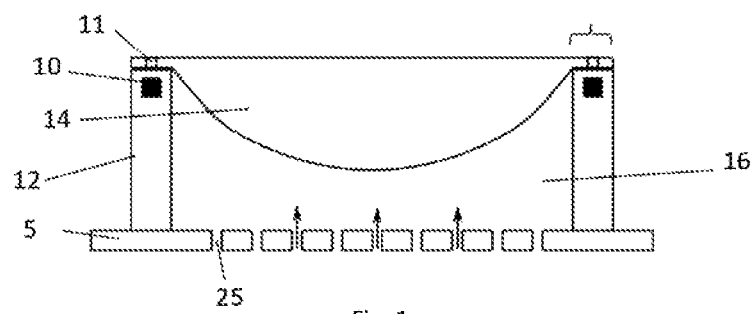

(51) Int. Cl.
*B33Y 30/00* (2015.01)
*B33Y 80/00* (2015.01)
*B29C 64/40* (2017.01)
*B29D 11/00* (2006.01)
*B29C 64/245* (2017.01)

(52) U.S. Cl.
CPC .. *B29D 11/00009* (2013.01); *B29D 11/00951* (2013.01); *B33Y 10/00* (2014.12); *B33Y 30/00* (2014.12); *B33Y 80/00* (2014.12)

(56) References Cited

U.S. PATENT DOCUMENTS

| | | | |
|---|---|---|---|
| 2015/0093544 A1 | 4/2015 | Van De Vrie et al. | |
| 2015/0192919 A1 | 7/2015 | Sketch et al. | |
| 2015/0273757 A1 | 10/2015 | Pforte et al. | |
| 2016/0161761 A1* | 6/2016 | Quere | B29C 64/124 |
| | | | 427/164 |
| 2017/0106399 A1* | 4/2017 | Sreenivasan | B05C 5/0291 |

OTHER PUBLICATIONS

Extended European Search Report for European Application No. 18182509.2; dated Nov. 7, 2018.

\* cited by examiner

DUPLEX PRINTING OF THREE-DIMENSIONAL STRUCTURES WITH ADJUSTABLE DEFORMATION CONTROL

BACKGROUND

The present invention relates to a method for printing a three-dimensional structure by depositing droplets of printing ink at least partially side by side and one above the other, comprising, the following steps: depositing droplets of printing ink in a first printing step in order to build up an intermediate first pre-structure, depositing droplets of printing ink in a second printing step in order to build up an intermediate second pre-structure on at least one side of the first pre-structure and rotating the first pre-structure and arranging the first pre-structure on a support structure in a rearrangement step between the first and the second printing step.

Thus, the present invention relates to a method for double-sided or duplex printing of a three-dimensional structure by depositing droplets of printing ink at least partially side by side and one above the other.

Such a method has been described in WO2013/167528 A1. The method described therein leaves several problems of duplex punting of three-dimensional structures unaddressed. E.g. according to the cited document, a mold is printed which supports the first pre-structure during the second printing step. The mold fixes and upholds the first pre-structure in its rotated position. The mold is, however, in general insufficient to prevent deformations of the printed pre-structures during the second printing step. First of all, capillary effects draw parts of the first pre-structure in a gap between the first pre-structure and the support structure after arrangement of the first pre-structure on the support structure. This leads to unwanted deformations of the first pre-structure and thus of the final three-dimensional structure comprising the first pre-structure and the second pre-structure, preventing duplex printing of three-dimensional structures of a specified shape. The first and second pre-structures are in this way joined to the support structure. Moreover, forces act on the rotated first pre-structure which consequently sags and deforms. These unwanted deformations are for example caused by polymer shrinkage and/or thermal expansion of the printing material as well as gravitation. It is a drawback of named method that in order to prevent unwanted deformations of the pre-structures, in particular the first pre-structure, the surface of the mold has to be extremely smooth and an exact imprint of the first pre-structure. Providing such a smooth and individual mold for each three-dimensional structure to be printed, results in a complicated, time- and material consuming duplex printing process and hampers the use of duplex printing in large-scale production of three-dimensional structures.

SUMMARY

It is therefore a purpose of the present invention to provide a flexible duplex printing method that can be easily and straightforwardly applied to structures of different shapes, with improved accuracy and precision, controlling deformations of the printed pre-structures during the printing process, in particular deformations caused e.g. by capillary effects, polymer shrinkage, thermal expansion as well as gravitational forces.

This object is accomplished according to the present invention by a method for printing a three-dimensional structure by depositing droplets of printing ink at least partially side by side and one above the other, comprising the following steps: depositing droplets of printing ink in a first printing step in order to build up an intermediate first pre-structure, depositing droplets of printing ink in a second printing step in order to build up an intermediate second pre-structure on at least one side of the first pre-structure, rotating the first pre-structure and arranging the first pre-structure on a support structure in a rearrangement step between the first and the second printing step, characterized in that the support structure comprises a carrier substructure and an deformation-control substructure, wherein the deformation-control substructure comprises a pressure chamber.

The pressure chamber protects the pre-structures from sagging through polymer shrinkage, thermal expansion and/or gravitational forces. Moreover, as no gap between support structure and pre-structure exists, capillary forces are inhibited. In this way, unwanted deformations of the printed pre-structures are advantageously avoided. Furthermore, a gluing of the first and second pre-structures to the support structure is prevented. No mold has to be provided that needs to be individually adapted to the shape of the structure to be printed. Rather, the deformation-control substructure comprising the pressure chamber protects all structures irrespective of their shape from unwanted, e.g gravitationally-induced, deformations, in particular sagging. Furthermore, the deformation-control substructure prevents deformations due to shrinking effects of the printing material, e.g. polymer shrinkage, as well as deformations caused through thermal expansion of the printing material. Alternatively, the deformation-control substructure may be used to induce intentional deformations in the pre-structures, e.g. the first pre-structure may be slowly inflated in order to achieve a meniscus lens via single sided printing. The method according to the present invention can thus easily and without alteration be applied to the printing of structures of differing shapes and weights. Additional material, as, e.g. for a mold, becomes superfluous. In this way, a time- and material-saving and flexible duplex printing method for three-dimensional structures is advantageously provided.

In the sense of the present invention, printing a three-dimensional structure is carried out by depositing droplets of printing ink side by side and one above the other in several consecutive depositing steps by means of a print head, wherein in each depositing step a plurality of droplets is ejected simultaneously by a plurality of ejection nozzles of the print head. The three-dimensional structure is thus build up layer by layer. As known from the prior art, the deposited droplets are at least partly cured after each depositing step in a curing step. The printing ink of the deposited droplets is either fully cured after each depositing step or only partly cured. It is a known technique from the prior art, see WO2013/167528 A1, to let a time interval elapse between the deposition of the droplets and their curing. This allows the droplets to flow under the influence of gravitation in a direction tangent to the surface of the layer just printed, resulting in a particularly smooth surface. Whereas for general three-dimensional, structures the smoothness of the layer surfaces is only important for the layers forming the surface of the final structure, a smooth layer structure is equally important for optically transparent structures, e.g. lenses. Preferably, the printing ink comprises an UV curable liquid monomer becoming a polymer if being cured. Preferably, the droplets are deposited onto a substrate. The substrate can be part of the printed structure or a support plate for supporting the deposited droplets only during the printing process. Three-dimensional printing through deposition of curable layers leads to deformation of the intended shape of the printed structure due to shrinking of the layer material, in particular during curing. Known countermeasures compensate for this shrinking effect through complex feedforward or feedback mechanisms under which the shrinking is pre-compensated for in the design of the three-dimensional structure to be build or dynamically compensated for by adjusting the print process on the basis of the dynamically measured shape of the object, respectively. I.e. these countermeasures do not eliminate the shrinking effects, but compensate for the resulting deformations. Printing on a substrate, however, beneficially prevents shrinking effects without resorting to compensation measures. Through the substrate, the three-dimensional structure under construction retains both its internal layered structure as well as its intended final shape. This is particularly important for applications which are negatively impacted by a deformation of the internal layers, e.g. optically transparent structures such as lenses as well as structures with embedded components requiring a fixed geometrical location such as flat Liquid Crystal Displays in an optical structure.

A particularly important application of the present invention is to the printing of optical components. I.e. the three-dimensional structure to be printed comprises an optical component, in particular a lens, in one embodiment. In, this embodiment, the printing ink comprises preferably transparent or translucent printing ink. The present invention is however not limited to this application.

In a preferred embodiment, the first pre-structure is provided with an extension during the first printing step and the first pre-structure is arranged on the support structure during the rearrangement step such that the extension rests at least partially on the carrier substructure of the support structure. The extension comprises a fixation extension, an anti-capillarity extension and/or a handling extension. The fixation extension allows a fixation of the pre-structures during the printing process. The handling extension allows an easy handling of the optical component during the printing process, preventing the actual printed structure from being deteriorated through contact. The anti-capillarity extension prevents capillary effects from dragging parts of the pre-structures into a gap between the first pre-structure and the support structure during and after the rearrangement step. In this way, unwanted deformations of the pre-structures due to capillary effects as well as a gluing of the pre-structures to the support structure are avoided. Preferably, the extension has a height of 5-1000 micrometers. Preferably, the extension comprises a seating or rim formed on the outer periphery of the first layers of the first pre-structure. In particular, in the first printing step the first pre-structure is printed with a seating or rim that extends beyond the perimeter of a main body of the first pre-structure. Thus, the first pre-structure comprises the main body and the extension, wherein the main body comprises the actual, intended structure to be printed. The extension advantageously prevents print material of the pre-structures to be dragged into gaps formed between the first pre-structure and the support structure through capillary action, thus avoiding the corresponding deformations. The first pre-structure is arranged on the support structure during the rearrangement step such that a main body of the first pre-structure is supported by the pressure in the pressure chamber. In particular, the main body closes off the pressure chamber of the deformation-control substructure.

In a preferred embodiment, the carrier substructure comprises an outer part of the support structure and the deformation-control substructure comprises an inner part of the support structure. In particular, the carrier substructure surrounds the deformation-control substructure, e.g. in the form of a ring or wall. Preferably, the carrier substructure encloses a space such that a pressure jar or pressure chamber is formed. The pressure chamber is preferably enclosed by the carrier substructure on all sides, the support plate or printing plate at the bottom and the first pre-structure during and/or after the rearrangement step at the top. Here and in the following, "bottom" and "top" are determined by the flight direction of droplets of printing ink during the printing process, i.e. droplets move from top to bottom. Preferably, the pressure chamber is sealed off at the contact region of first pre-structure, in particular the extension, and carrier substructure. Preferably, the pressure chamber is filled with a control medium, gas or liquid. e.g. air. The pressure of the control medium can be controlled via active flow control. Preferably, the temperature and/or composition of the control medium can be controlled, i.e. adapted and changed, as well.

In a preferred embodiment, the control medium comprises water. In an alternative preferred embodiment, the control medium comprises a material that has low viscosity when filled into the pressure chamber and high viscosity during the actual printing. Low viscosity simplifies the filling process, whereas high viscosity advantageously prevents the formation of ripples in the control medium caused by vibrations of the printer during printing. Preferably, the viscosity of the control medium is changed during the printing process, for example through temperature change. This is achieved through a control medium comprising a phase-change material, e.g. an organic phase-change material. The control medium comprises an oil or wax. Preferably, the control medium is electrically non-conductive to prevent short, circuits through leakage of the control medium. E.g. the control medium comprises an electrically non-conductive oil or hot melted polymers.

The three-dimensional structure to be printed can be of any geometrical shape. The present method is particularly suitable, however, for three-dimensional structures of flat shape. In the sense of the present invention, a structure of flat shape is a three-dimensional structure that is thin in one dimension, i.e. the extension of the structure in one dimension is noticeably smaller than the extension of the structure in the other two dimensions. Preferably, the design of the three-dimensional structure is split into two parts forming the first and second pre-structure, respectively, with a central surface, preferably plane, forming the contact surface of the two parts. For a three-dimensional structure of flat shape, the central surface constitutes preferably a central plane orthogonal to the thin dimension. Here, 'central' does not imply that the surface or plane lies in a particular geometrical or mechanical plane, e.g. crosses the center of gravity or the like.

After completion of the first pre-structure, the first pre-structure is preferably placed upside-down on the support structure during the rearrangement step. The first layer of the first pre-structure thus forms the at least one side and acts as a substrate for the printing of the second pre-structure during the second printing step. In this way, the first layer of the first pre-structure retains the shape of the second pre-structure and the shape of the internal layers of the second pre-structure during the second printing step. Even though the first layer of the first pre-structure can have any shape, the first layer of the first pre-structure is preferably flat, thus providing a flat substrate in the second printing step. Preferably, the first pre-structure is placed on the support structure to act as a lid on the pressure chamber, i.e. it closes off the pressure chamber. For a three-dimensional structure of flat shape, the first pre-structure is preferably rotated by 180° about an axis that passes along one of its non-thin dimensions.

In a preferred embodiment, the second printing step comprises a post-processing step, e.g. a coating step or a final hardening or curing step. After the second printing step, the printed structure is removed from the printer and further post-processing may be carried out, e.g. cutting, edging or framing.

According to a preferred embodiment of the present invention, the pressure in the pressure chamber is dynamically adjusted to cancel the forces deforming the first pre-structure and/or the second pre-structure. In particular, the pressure in the pressure chamber is dynamically adjusted to cancel the gravitational forces deforming the first pre-structure and/or the second pre-structure. By regulating the pressure of the control medium m the pressure chamber, a dynamically adjustable force can be advantageously exercised on the first pre-structure, such that the first pre-structure does not deform. In particular, sagging of the first pre-structure and consequently of the second pre-structure due to polymer shrinkage, thermal expansion and/or gravitation is in this way advantageously prevented.

According to a preferred embodiment of the present invention, the support structure comprises semi-open elements such that a dynamically adjustable pressure gradient is generated in the pressure chamber. The semi-open elements determine the flow of the control medium in the pressure chamber, generating a pressure gradient along the first pre-structure. Herewith, a dynamically adjustable force gradient across the first pre-structure is generated. In an alternative embodiment, the pressure in the pressure chamber is essentially uniform, generating a uniform pressure across the first pre-structure.

According to a preferred embodiment of the present invention, the pressure in the pressure chamber is adjusted depending on the printing data during the second printing step. Herewith it is advantageously possible to adjust the pressure and thus the deformation-canceling force, e.g. the gravitation-canceling force, according to the structure to be build. In particular, the pressure is dynamically adjusted to the printing process as provided by the printing data. Printing data are any data used by the print head to determine the location and volume of ejected droplets of printing ink. Printing data comprise CAD data. The printing data encode in particular the shape of the structures to be printed.

According to a preferred embodiment of the present invention, properties of the first pre-structure and/or the second pre-structure are measured during intermediate measurement steps and the pressure in the pressure chamber is adjusted depending on the measurement results. Herewith a feedback bop is advantageously provided that ensures that the pre-structures do not deform during the printing process. Preferably, the intermediate measurements determine whether the first pre-structure retains its initial shape or not. Alternatively or additionally, the intermediate measurements determine whether the second pre-structure retains its intended shape. Preferably, printing data are additionally used to establish, whether the first and/or second pre-structure retain their initial or intended shape, respectively. Measurements comprise contact or non-contact measurements. Preferably, the intermediate measurements are dynamic position measurements. Intermediate measurement steps may be carried out after each deposition of droplets or layers of printing ink or at certain intervals. Preferably, the intermediate measurement steps are carried out during the first and/or second printing step. It is also conceivable that intermediate measurement steps are carried out during the rearrangement step, after placement of the first pre-structure on the support structure.

According to a preferred embodiment of the present invention, the surface properties of at least one surface of the first pre-structure and/or the second pre-structure are determined during the intermediate measurement steps, in this way it is advantageously possible to determine whether the first and/or second pre-structures retain their initial or intended shape, respectively, from a simple surface measurement. Surface properties to be measured are in particular geometrical properties of the surface, e.g. surface profiles, line profiles, profile scans, height, distance from the print head or any other reference point and surface gradients. In the following, a measurement of surface properties is referred to as "surface measurement" for the sake of brevity. Preferably, the deformation of the first pre-structure is deduced from a surface measurement of the upper surface, i.e. the last printed layers, of the first pre-structure. Preferably, the deformation of the first and/or second pre-structure is deduced from a surface measurement of the upper surface, i.e. the last printed layers, of the second pre-structure. Alternatively or additionally, a deformation of the first and/or second pre-structure is deduced from a surface measurement of the central surface. Surface measurements may be carried out from below or above the first and second pre-structures, where "below" and "above" are determined by the flight direction of droplets of printing ink during the printing process, i.e droplets move from above to below. If printing in the first printing step is carried out on a substrate that is subsequently not removed, the substrate forms part of the first pre-structure for the purpose of this document.

According to a preferred embodiment of the present invention, the surface properties are determined by optical measurements. In this way, surface properties can be determined through non-contact measurements. The printed structure is thus not mechanically impaired by the intermediate measurements. Optical measurements include laser measurements such as laser interferometry and laser triangulation as well as coherence scanning interferometry. The optical measurements may be carried out on the full surface, only pointwise or in one-dimensional, e.g. line, scans.

According to a preferred embodiment of the present invention, the first pre-structure and/or the second pre-structure comprises reference points, the location of which are measured during the intermediate measurement steps in order to determine properties of the first pre-structure and/or the second pre-structure. It is herewith advantageously possible to detect deformations of the pre-structures in simple, non-contact measurements. Preferably, the reference points are located in the central surface or central plane. If a substrate forms part of the first pre-structure the reference points may be located in the substrate.

According to a preferred embodiment of the present invention, the carrier substructure comprises a fixation means and the first pre-structure is fixed to the carrier substructure by the fixation means. It is herewith advantageously possible to prevent a movement of the pre-structures as a result to the force exerted by the pressure in the pressure chamber. In particular, the fixation means fixes the first pre-structure to the carrier substructure such that it is not e.g. lifted up by the control medium. In particular, the fixation force is strong enough to prevent a vertical movement of the first pre-structure, but allows a horizontal movement of the first pre-structure, in particular due to an, e.g. heat-induced, extension of the first pre-structure. Preferably, the first pre-structure, in particular the extension, is clamped to the carrier substructure. The fixation means is part of the carrier substructure. The first pre-structure, in particular the extension, may comprise corresponding means that allow a clamping of the first pre-structure to the carrier substructure. In the sense of the present invention, the fixation is not permanent. Rather, the first pre-structure gets fixed to the carrier substructure during or after the rearrangement step. Preferably, the fixation starts with the injection of pressure into the pressure chamber. The fixation is released such that the pre-structures can be removed, preferably at the end of the printing process, i.e. after the second printing step. The first pre-structure is fixed to the carrier substructure e.g. mechanically, electromagnetically and/or through high or low pressure.

According to a preferred embodiment of the present invention, the fixation means comprises an electromagnetic element and the first pre-structure is fixed to the carrier substructure through electromagnetic forces. The electromagnetic element advantageously clamps the first pre-structure, in particular the extension, to the carrier substructure. Preferably, the electromagnetic element comprises an electromagnet that can be turned on and off to clamp and release the first pre-structure. Correspondingly, the first pre-structure may comprise an electromagnetic element, e.g. an electromagnetic ring or metallic ring, which interacts with the electromagnetic element of the carrier substructure. It is conceivable that carrier substructure and/or first pre-structure comprise one or more electromagnetic elements. E.g. several electromagnetic elements may be arranged equidistantly along the perimeter of the carrier substructure.

According to a preferred embodiment of the present invention, the orientation and/or the position of the first pre-structure and/or the second pre-structure are changed through the electromagnetic element of the carrier substructure. The pre-structure can be moved contactlessly through the electromagnetic elements. In particular, in conjunction with a second electromagnetic element inside the first pre-structure, preferably in the extension, does it provide an efficient and easy means to control and adjust the position of the pre-structures.

According to a preferred embodiment of the present invention, the fixation means comprises a vacuum chamber and the first pre-structure is fixed to the carrier substructure through a vacuum in the vacuum chamber. In the sense of the present invention, "vacuum" comprises a low-pressure environment, wherein the pressure is low enough to clamp the first pre-structure to the carrier substructure. Preferably, the carrier substructure comprises an inner part and an outer part, wherein a vacuum chamber is enclosed by the inner and outer parts. The inner and outer parts may be concentrically arranged rings or walls. The first pre-structure, preferably the extension, seals off the vacuum chamber. The carrier substructure may comprise a seal to this end. The pressure in the vacuum chamber is chosen such that the first pre-structure is clamped to the carrier substructure. It may be necessary to change the pressure in the vacuum chamber depending on the pressure in the pressure chamber. E.g. if the pressure in the pressure chamber is increased, the pressure in the vacuum chamber may be reduced in order to keep the pre-structures in place. In particular, the first pre-structure is fixed to the carrier substructure at the end of the rearrangement step. Preferably, the vacuum is turned on slightly before or at the same time as the pressure in the pressure chamber is turned on. In order to release the pre-structures, the vacuum is turned off, preferably at the end of the printing process, i.e. after the second printing step.

According to a preferred embodiment of the present invention, the first pre-structure is released from the carrier substructure after the second printing step. It is herewith advantageously possible to remove the final three-dimensional structure form the printer. The release of the first pre-structure may comprise releases electromagnetic forces, e.g. through turning off an electromagnetic element or turning off a vacuum. If the fixation means is apt at fixing the first pre-structure mechanically, the release of the pre-structure comprises a mechanical release.

According to another preferred embodiment of the present invention, the first and/or second pre-structure is deformed, through a targeted temperature change, in particular through heating or cooling after depositing at least one droplet of printing ink. Herewith, it is advantageously possible to induce shape changes of the first and/or second pre-structure in a simple, fast, cost-effective and targeted manner. In particular, through cooling, the cooled layer or cooled area of the printed layer shrinks. Consequently, cooling induces a sagging of the printed structure. Correspondingly, through heating, the heated layer or heated area of the printed layer expands, resulting in a bulging of the printed structure. In this way it is advantageously possible to compensate for unwanted deformations, e.g. through polymer shrinkage and/or thermal expansion, through cooling and/or heating. Preferably, the temperature change is induced through top heating or top cooling, i.e. the first and/or second pre-structure is heated or cooled from above. Cooling or heating are carried out by a vortex tube, for example. Preferably, heating or cooling is carried out after each droplet deposition or after printing of a layer is finished. Alternatively, heating or cooling is carried out repeatedly after a defined number of droplet depositions or after a defined number of layers has been printed. The temperature change may be local or comprise the entire surface of the first and/or second pre-structure.

Another object of the present invention is a three-dimensional structure printed by a method according to any of the claims 1 to 14, wherein the printed three-dimensional structure comprises the first pre-structure and the second pre-structure. In printing a three-dimensional structure with a duplex printing method of the present invention, a three-dimensional structure with particularly smooth surfaces is provided. As the upper surfaces of the first and second pre-structure, are printed under the smoothening effect of gravitational forces acting tangent to both surfaces during the printing process, the upper surfaces of the first and second pre-structure are particularly smooth. It is an advantage of the presented duplex printing method, that this gravitational smoothing can be exploited for two surfaces of the final structure, preferably the upper and lower surfaces of the final three-dimensional structure. The deformation-control substructure in the form of the pressure chamber comprises a flexible means to prevent any deformations due to unwanted forces caused e.g. by polymer shrinkage, thermal expansion of the printing material and/or gravitational effects such, as sagging. The extension prevents impairments of the intended final shape, e.g. through capillary action, as well as easy handling and a fixation means. Thus, a three-dimensional structure of high accuracy and precision is printed. Not only does the intended shape coincide with the final shape to a high degree of accuracy, but also the internal layered shape can be retained. This is particularly important for optical components.

According to a preferred embodiment of the present invention, the three-dimensional structure comprises an optical component, in particular a lens. The optical component is, preferably thin in one dimension. The upper surfaces of the first and second pre-structure comprise the first and the second surface of the final optical component, in particular the inner and outer surface of a lens. The surfaces of the first and second pre-structures are preferably convex, concave or plane. The central surface is a central plane, flat and preferably orthogonal to the thin dimension. Preferably, the optical component is round in the dimensions orthogonal to the thin dimension. Particularly preferably, the optical component forms a duplex printed lens blank. The optical component may comprise an extension, forming a rim or seating around the outer perimeter of the component, in particular a flat ring.

Another object of the present invention is a duplex printer for printing three-dimensional structures with a method according to any of the claims 1 to 14, wherein the printer comprises a printing unit, a measurement unit and a pressure control unit. Herewith, a duplex printer for flexible, high-accuracy duplex printing of three-dimensional structure is advantageously provided. The measurement unit in conjunction with the pressure control unit ensures that the structure to be printed is not impaired by deformations due to polymer shrinkage, thermal expansion and/or sagging under gravitational under gravitational forces. In particular, a feedback loop is provided that ensures high accuracy and precision in the printing process. In particular, it ensures that the final shape of the three-dimensional structure coincides with the intended shape to a high degree of accuracy. Moreover, the printer is flexible with respect to the shape of the structure to be printed. With the pressure chamber a deformation-control substructure is provided that is identical for every shape of the structure to be printed.

Preferably, the printing unit comprises a print head with ejection nozzles for the deposition of droplets of printing ink. Such print heads and printing units are known. The printing unit may be a printing unit of a 3d- or inkjet printer. The printing unit further comprises a printing plate or support plate towards which the deposited droplets are ejected. The printing plate may comprise openings for the insertion or release of the control medium in the area of the pressure chamber. The printing plate may comprise openings for the pumping of the vacuum in the area of the vacuum chamber. The measurement unit comprises a measurement apparatus for the measurement of properties, in particular surface properties, of the first pre-structure. In particular, the measurement unit may comprise an apparatus for optical measurements, e.g. laser displacement sensors, interferometric sensors, confocal chromatic measurement systems, white light scanners, etc. The pressure control unit monitors and adjusts at least the pressure in the pressure chamber. It releases and injects the control medium into the pressure chamber. Additionally, it may monitor and control the vacuum in the vacuum chamber. Alternatively, the printer may comprise two separate pressure control units for the pressure chamber and the vacuum chamber, respectively. The two pressure control units may be connected through data exchange. In a preferred embodiment, the printer comprises an additional handling unit comprising the electromagnetic element of the carrier substructure and, preferably, the first pre-structure. The handling unit allows handling, i.e. arrangement and reorientation, of the first pre-structure, in particular after the first printing step.

In a preferred embodiment, the printer comprises a heating/cooling unit such as a heating and/or cooling device. Preferably, the heating/cooling unit is apt at targeted heating and/or coding of the structure being printed. Particularly preferably, heating and cooling are carried out from above through top cooling and top heating. These requirements are met by a vortex tube, for example.

REF DESCRIPTION OF THE DRAWINGS

FIG. 1 schematically illustrates a duplex printing method according to an exemplary embodiment of the present invention.

Figure 2:
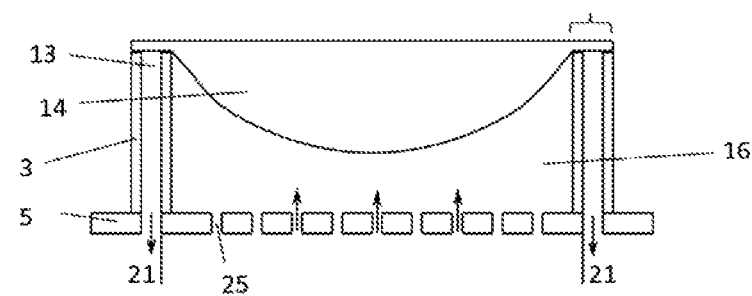

FIG. 2 schematically illustrates a duplex printing method according to an exemplary embodiment of the present invention.

Figure 3:
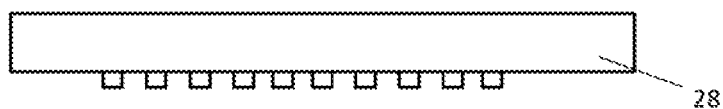
Figure 3:
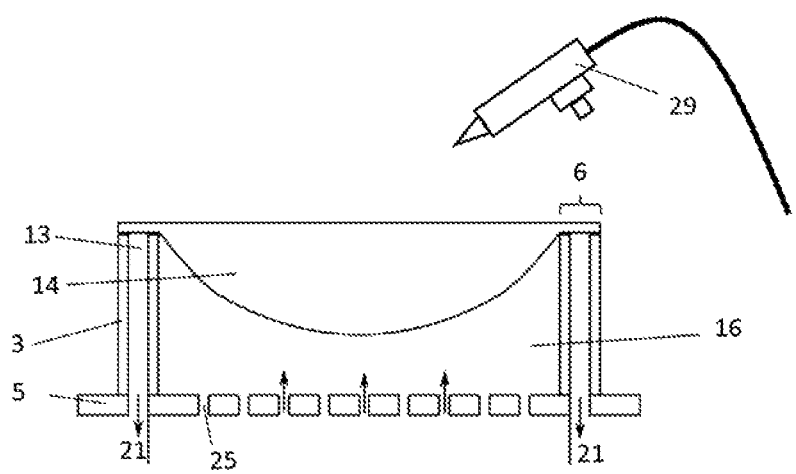

FIG. 3 schematically illustrates a duplex printing method according to an exemplary embodiment of the present invention.

Figure 4:
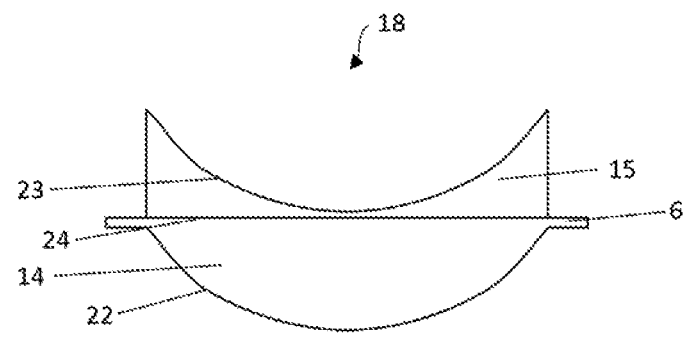

FIG. 4 schematically illustrates a three-dimensional structure printed with a duplex printing method according to an exemplary embodiment of the present invention.

Figure 5:
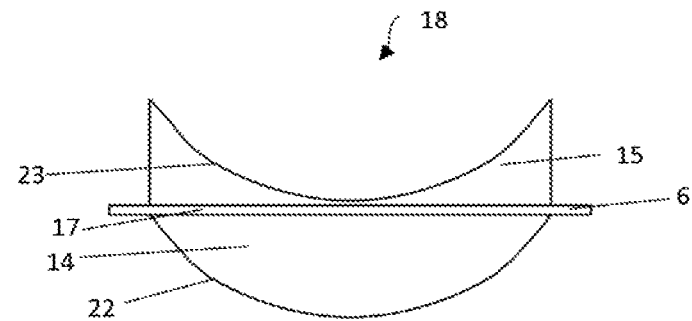

FIG. 5 schematically illustrates a three-dimensional structure printed with a duplex printing method according to an exemplary embodiment of the present invention.

DETAILED DESCRIPTION

The present invention will be described with respect to particular embodiments and with target to certain drawings but the invention is not limited thereto but only by the claims. The drawings described are only schematic and are non-limiting. In the drawings, the size of some of the elements may be exaggerated and for illustrative purposes may not be drawn to scale.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a duplex printing method according to an exemplary embodiment of the present invention are schematically illustrated. In a first printing step, a first pre-structure 14 is printed through deposition of droplets of printing ink at least partially side by side and one above the other. Thus, the first pre-structure 14 is build up successively layer by layer. The printing ink is ejected from the ejection nozzles of a print head 28 of an inkjet or droplet-on-demand printer. The printing ink in, this embodiment is ejected towards a printing plate 5. Alternatively, a substrate 17 may be arranged on the printing plate 5 and the droplets may be deposited on the substrate 17. The substrate 17 has the advantage that it comprises a simple means to prevent shrinking of the printed layers. Due to residual stresses, three-dimensional structures 18 printed through deposition of layers as in the additive manufacturing process described here, are subject to shrinking. In particular, shrinking occurs during curing of the deposited layers. If the layers are deposited on a substrate 17, they bond to the substrate 17 and their initial shape is retained, advantageously retaining the intended layered structure as well as the intended final shape of the three-dimensional structure 18. This is particularly important for optically transparent structures, e.g. lenses, and structures with embedded functional components which are provided at fixed locations of the final three-dimensional structure 18. Preferably, the droplets of printing ink are at least partially cured in intermediate curing steps. Curing may be carried out through irradiation with light, in particular UV light. The printing ink comprises a curable printing ink, preferably a monomer becoming a polymer upon curing. Particularly preferably, a time interval elapses between deposition of the droplets and their curing. This allows the droplets to flow and to merge or coalesce. In this way, particularly smooth surfaces are provided, for the individual layers as well as of the final printed structure. It is a particular advantage of the duplex printing method, that the first and the second surface 22, 23 of the final three-dimensional structure 18 can both be printed under the exploitation of tangential gravitational forces. Under the influence of these forces, the droplets flow and thus smoothen the surface of the printed layer. In this way, a three-dimensional structure 18 with a particularly smooth surface is provided. In a preferred embodiment of the present invention, the first pre-structure 14 is provided with an extension 6. In the present embodiment, the first pre-structure is thin in one dimension and round in the two dimensions orthogonal to the thin dimension. The extension 6 forms a ring or seating along the perimeter of the first pre-structure 14. Preferably, the extension 6 is provided at the bottom, i.e. in the first printed layers, of, the first pre-structure 14. The extension 6 is preferably between 100 and 1000 micrometres thick. In a preferred embodiment, the first layers of the first pre-structure 14 are only partially cured. After the first printing step, the first pre-structure 14 is lifted from the printing plate 5, rotated and arranged on a support structure 2 in a rearrangement step. Preferably, the first pre-structure is flipped by 180° so that the underside 26 of the first pre-structure 14 faces the ejection nozzles of the print head 28. In particular, the first pre-structure 14 is arranged on the support structure 2 such that the extension 6 rests on a carrier substructure 3 of the support structure 2 and the main body of the first pre-structure 14 is supported by an deformation-control substructure 3. The deformation-control substructure 4 comprises a pressure chamber 16. The extension 6 seals off the pressure chamber 16 against the carrier substructure 3. Between the extension 6 and the carrier substructure 3 a seal may be provided. Whereas the extension 6 in conjunction with the carrier substructure 3 prevents the occurrence of capillary effects and corresponding capillary-induced deformations, the deformation-control substructure 4 prevents unwanted, e.g. gravitationally-induced, deformations, in particular sagging of the pre-structures 14, 15. In particular, the pressure in the pressure chamber 16 is adjusted in order to cancel the deforming forces induced e.g. by polymer shrinkage and/or thermal expansion of the printing material and/or gravitational forces causing a sagging of the pre-structures 14, 15. To this end, a control medium is injected into the pressure chamber 16. The control medium comprises a liquid or gas, preferably air. In an alternative embodiment, the control medium comprises a material of variable viscosity. Preferably, the control medium has low viscosity when injected into the pressure chamber and high viscosity during printing. This advantageously minimizes the formation of ripples on the surface of the control medium caused by vibrations of the printer. For example, the control, medium comprises a phase-change material, preferably an electrically non-conductive organic phase-change material. Alternatively or additionally, the control medium comprises an oil, e.g. a hydraulic electrically non-conductive oil of low viscosity upon injection and high viscosity during printing. An alternative choice is a control medium comprising a solid malleable at ambient temperature, such as a wax or hot melted polymers. The control medium may be injected through openings 25 in the printing plate 5. Preferably, the pressure in the pressure chamber 16 can be monitored and controlled, i.e. adapted and changed. The pressure inside the pressure chamber 16 may be uniform across the first pre-structure 14. Alternatively, the carrier substructure 3 comprises at least semi-open elements which generate a pressure gradient across the first pre-structure 14. The rearrangement step may comprise a surface preparation step in which the surface of the side of the first pre-structure facing the ejection nozzles at the end of the rearrangement step is treated in order to improve its adhesion properties. If the first layers of the first pre-structure 14 are only partly cured, such a surface preparation step may not be necessary and the only partly cured droplets of printing ink merge and bond efficiently with the droplets deposited during the second printing step. Alternatively and additionally, the surface may be heated or roughened, e.g. through engraving, in order to enhance its adhesion properties. Printing of the second pre-structure 15 is carried out in the second printing step. The second pre-structure is printed on the side of the first pre-structure 14 facing the ejection nozzles of the print head 28, preferably the bottom, i.e. first layers of the first pre-structure 14. In this way, a flat substrate for the second printing step is provided. If the first pre-structure 14 has been printed on a substrate 17, this substrate 17 may be removed during the rearrangement step or form part of the first pre-structure 14 and thus of the final three-dimensional structure 18. In this embodiment, droplets are deposited on the underside of the substrate 17 during the second printing step. In a preferred embodiment, measurements are carried out on the first and/or second pre structures 14, 15 in order to determine deformations of the pre-structures 14, 15. Preferably, the surface properties of the first and/or second pre-structures 14, 15 are determined. Surface properties include profiles, height, distance to the measurement unit or any other reference point, deformations of the surface, height variations, gradients etc. Preferably, the pressure in the pressure chamber 16 is adjusted depending on the detected deformations of the pre-structures 14, 15. In this way, a feedback loop is advantageously provided which allows a continuous adaptation of the deformation-control substructure 4, in particular the pressure in the pressure chamber 16, on the actual acting forces and deformations. In a preferred embodiment, surface measurements are carried out on the upper surface, i.e. the last printed layers, of the first pre-structure 14. These measurements may be carried out from below or above the first pre-structure 14, preferably from below. E.g. surface properties may be determined through laser measurements such as laser triangulation and/or white light scanning (coherence scanning interferometry) and/or confocal chromatic measurement. Measurements may be carried out in full surface scans or fast line scans or area- or pointwise. Additionally, printing data may be used to adjust the pressure in the pressure chamber 16, preferably in conjunction with the measurement results. This is particularly beneficial if surface properties of the second pre-structure 15 are determined during the measurement steps. Whereas for the first pre-structure 14, the measurement establishes whether or not the first pre-structure 14 retains its initial shape, in case of the second pre-structure 15, the measurement has to establish whether or not the second pre-structure 15 retains or obtains its desired shape. The printing data, in particular of the second pre-structure 15, are thus useful in comparing the measured with the intended shape. The pressure in the pressure chamber 16 exerts an upwards directed force on the pre-structures 14, 15 that may lift up or otherwise delocate the pre-structures 14, 15. To prevent such an unwanted movement of the pre-structures 14, 15, the support structure 2, in particular the carrier substructure 3, comprises a fixation means. The fixation means fixes or clamps the first pre-structure 14, preferably the extension 6, to the carrier substructure 3. The first pre-structure 14 is preferably fixed to the carrier substructure from the moment in which the pressure is injected into the pressure chamber 16 until the pressure is released and the final three-dimensional structure 18 removed from the printer at the end of the second printing step. Preferably, the fixation means exerts a controllable force on the first pre-structure 14, preferably in conjunction with a second fixation means provided in the first pre-structure 14. In a preferred embodiment, the fixation means comprises an electromagnetic element 10 of the carried substructure and an electromagnetic element 11 located in the extension 6. In the present embodiment, where the carrier substructure 3 forms a ring, the electromagnetic element 10 may comprise a ring-shaped electromagnet along the perimeter of the carrier substructure 3. Alternatively, the electromagnetic element 10 comprises several electromagnets that are spaced equidistantly along the perimeter of the carrier substructure 3. The electromagnetic element 11 may comprise a metallic ring or a ring-shaped electromagnet. The reverse arrangement is also conceivable: the carrier substructure 3 may comprise a metallic ring, whereas the extension 6 provides the ring-shaped electromagnet. When e.g. the electromagnet 10 is turned on, the first pre-structure 14 is clamped to the carrier substructure 3. The clamping or fixation force can be controlled through the strength of the electromagnetic force exerted by the electromagnet. This force may be adapted depending on the exerted pressure in the pressure chamber 16 and thus change during the printing process. At the end of the second printing step, the electromagnet may be turned off or its polarity reversed in order to lift off the final three-dimensional structure 18 from the support structure 2. The second printing step may involve post-processing steps such, as final curing or hardening or coating.

In FIG. 2, a duplex printing method according to an alternative exemplary embodiment of the present invention are schematically illustrated. The present embodiment differs from the embodiment depicted in FIG. 1 in the fixation means. The fixation means in the present embodiment comprises a vacuum chamber 13. The vacuum chamber 13 is provided as part of the carrier substructure 3. Preferably, the carrier substructure 3 comprises a hollow ring, inside of which a vacuum chamber 13 is provided. In particular, the carrier substructure 13 comprises an inner part, an outer part and a space enclosed by the inner and outer parts and sealed at the top through the extension 6. This space comprises a vacuum chamber 13. Preferably, the inner and outer parts constitute inner and outer walls of the carrier substructure 3. Alternatively, the carrier substructure 3 comprises hollow pillars inside of which vacuum chambers 13 are located, respectively. The first pre-structure 14 is clamped or fixed to the carrier substructure 3 through the application of a vacuum 21 in the vacuum chamber 13. Preferably, the strength of the applied vacuum 21 is adjusted depending on the pressure exerted in the pressure chamber 16. Additionally, printing data may be used to determine the strength of the applied vacuum 21. Preferably, the vacuum 21 is applied before or at the instant in which the control medium is injected into the pressure chamber 16. The vacuum is preferably turned off at the end of the second printing step in order to release the final three-dimensional structure 18.

In FIG. 3, a duplex printing method according to an alternative exemplary embodiment of the present invention are schematically illustrated. In addition to the embodiment of FIG. 2, the first pre-structure 14 is submitted to a targeted temperature change during the printing process. Submitting the first pre-structure 14 to a temperature change is described in the following without loss of generality. It is clear that the described method can be applied to the second pre-structure 15 either alternatively or additionally. The temperature change comprises a heating or a cooling of the first pre-structure 14 during or at the end of the first printing step. Heating or cooling may be carried out only once or multiple times during the first printing step, E.g. the heating or cooling are carried out after each droplet deposition, after printing of a finished layer or at certain intervals during the first printing step. Either the whole surface or only partial areas of the surface of the structure printed so far are exposed to heat or cold. Preferably, the temperature change is induced from above, i.e. the first pre-structure 14 is preferably subjected to top cooling or top heating during or at the end of the first printing step. Through heating or cooling, the shape of the structure printed so far is changed. In particular, cooling results in a shrinkage of the cooled area, whereas heating leads to an expansion of the heated area. Consequently, the first pre-structure 14 sags due to cooling and bulges due to heating. Thus, targeted temperature changes can be used to deform the structure printed so far. Preferably, this is used to compensate for unwanted deformations occurring e.g. through polymer shrinkage and/or thermal expansion of the printing material or through errors of the printing process. Thus, targeted heating or cooling provide an effective deformation control, enabling a high-accuracy duplex printing. Depending on the intended shape changes, both cooling and heating can be applied during the first printing step. Preferably, the targeted temperature change is induced depending on the measurement results obtained in at least one intermediate measurement step. Thus, the first pre-structure 14 is e.g. subjected to a targeted temperature change after each measurement step. Preferably, the temperature change, in particular the intended temperature of the first pre-structure 14 and the location of the temperature change, is determined depending on the measurement results. Preferably, the first pre-structure 14 is connected with a temperature sensor for temperature control. Heating or cooling preferably yield temperature changes in the printed structure of up to 50° C., particularly preferably up to 20° C. Corresponding cooling and heating temperatures depend on the size and shape of the structure being printed as well as its material. Cooling and heating temperatures may differ by up to 50° C. from the ambient temperature during printing, for example. Preferably, the printer comprises a heating and cooling means. Effective targeted top heating and top cooling in the manner described above preferably relies on a vortex tube as heating and cooling means.

In FIG. 4, a printed three-dimensional structure 18 according to an exemplary embodiment of the present invention is schematically illustrated. The three-dimensional structure 18 comprises a first pre-structure 14 and a second pre-structure 15 as well as an extension 6. The extension 6 forms part of the first pre-structure 14. In particular, the extension 6 comprises a seating or rim along the perimeter of the first pre-structure 14. The first and second pre-structures 14, 15 may comprise optical components. In particular, the first and second pre-structures comprise plan-convex and/or plan-concave lens structures. The first and second pre-structures 14, 15 are printed in a duplex printing process by depositing droplets of printing ink at least partially side by side and one above the other. The first and second pre-structures 14, 15 are therefore build up from layers of printing ink. The first and second pre-structures 14, 15 both comprise a layered structure. The duplex printing process provides a final three-dimensional structure 18 with particularly smooth first and second surfaces 22, 23. These first and second surfaces 22, 23 are the upper surfaces of the first and second pre-structure 14, 15, respectively. The upper surface 22 of the first pre-structure 14 comprises the last layers printed during the first printing step. The upper surface 23 of the second pre-structure 15 comprises the last layers printed during the second printing step. During the first and second printing step, droplets of printing ink are smeared under the influence of a gravitational force that advantageously acts tangential to the surface of the just printed layer. In this way, gravitation can be, exploited to obtain a particularly smooth surface, both of the printed layer at hand as well as of the final three-dimensional structure 18. This is particularly beneficial for three-dimensional structures 18 that are optically transparent, i.e. for optical components, in particular lenses. The second pre-structure 15 is printed on the at least one side 26 of the first pre-structure 14 during the second printing step. The central surface 24 which is the surface of contact of the first and second pre-structures 14, 15 preferably constitutes thus a central plane 24. This central plane 24 provides a flat substrate for the second printing step. The at least one side 26 is preferably treated in a surface preparation step. In particular, the adhesion properties of the at least one side 26 are enhanced during the surface preparation step. Preferably, the at least one side 26 is heated or roughened, e.g. through engraving, before the second printing step. Preferably, the extension is printed as part of the first layers of the first pre-structure 14 during the first printing step. The extension 6 may be removed after removal of the three-dimensional structure 18 from the printer in a post-processing step. If the three-dimensional structure 18 comprises an optical component, in particular a lens or lens blank, the extension 6 does not need to be removed if the lens is framed, edged or cut in post-processing step, e.g. during fitting the lens to a pair of glasses. If the lens is directly printed in its final shape, a removal of the extension 6 in the post-processing step is necessary.

In FIG. 5, a printed three-dimensional structure 18 according to an exemplary embodiment of the present invention is schematically illustrated. The three-dimensional structure 18 differs from the exemplary embodiment of the three-dimensional structure 18 depicted and described in FIG. 4 in so far as the three-dimensional structure 18 of the present embodiment comprises a substrate 17. The first pre-structure 14 is printed on a substrate 17 during the first printing step. The substrate 17 provides a flat surface on which the first layers of the first pre-structure 14 are printed. In particular, the substrate 17 inhibits shrinking effects that otherwise occur during the printing process, especially during curing, due to acting residual stresses. Thus, due to the substrate 17, the first pre-structure 14 retains its layered structure as well as its intended final shape. This is particularly important for optically transparent structures as well as structures into which functional components are integrated. In both cases, the layered structure needs to be controlled and retained. The first pre-structure 14 is printed on a first side of the substrate 17. The substrate 17 forms part of the first pre-structure 14 at the end of the first printing step. The side opposite the first side of the substrate 17 forms the at least one side 26 of the first pre-structure 14. The second pre-structure 15 is printed on the at least one side 26 of the first pre-structure 14, i.e. on the side opposite to the first side of the substrate 17. In this way, also the second pre-structure 15 retains its layered structure and intended final shape. In particular, shrinking effects are suppressed. The substrate 17 preferably comprises a flat substrate 17, particularly preferably a flat disk 17. The diameter of the flat disk 17 extends beyond the perimeter of the printed first pre-structure 14. In this way, an extension 6 is advantageously provided. The substrate 17 comprises the extension 6. The three-dimensional structure 18 thus comprises a first pre-structure 14, a second pre-structure 15, as well as a substrate 17 and an extension 6. The substrate 17 may be treated during a surface preparation step before the second printing step in order to enhance adhesion properties of the substrate 17. The substrate 17 may be heated or roughened, e.g. through engraving, during the surface preparation step. The substrate 17 may be printed or otherwise be provided, e.g. prefabricated and loaded into the printer. The printed substrate 17 may comprise printing ink identical to the printing ink used during the first and/or second printing ink. This alleviates the bonding properties to the first and second pre-structures 14, 15. Alternatively, the substrate is not printed, but e.g. produced by any other conventional means. For an optical component, the substrate 17 preferably comprises a transparent or translucent material. In a preferred embodiment, the substrate 17 is formed by casting.

KEY TO FIGURES

1 Mold
2 Support structure
3 Carrier substructure
4 Deformation-control substructure
5 Printing plate
6 Extension
7 Capillary action
8 Pillar
9 Sheet
10 Electromagnetic element of the carrier substructure
11 Electromagnetic element of the first pre-structure
12 Ring
13 Vacuum chamber
14 First pre-structure
15 Second pre-structure
16 Pressure Chamber
17 Substrate
18 Three-dimensional structure
19 Gap
20 Gravitational force
21 Application of vacuum
22 Upper surface of the first pre-structure
23 Upper surface of the second pre-structure
24 Central surface
25 Openings in printing plate
26 At least one side of the first pre-structure
27 Soft-matter block
28 Print head
29 Heating and/or cooling means

What is claimed is:

1. A method for printing a three-dimensional structure by depositing droplets of printing ink at least partially side by side and one above an other, comprising the following steps:
   depositing droplets of printing ink in a first printing step in order to build up an intermediate first pre-structure, wherein the first pre-structure comprises a main body and an extension, wherein the extension comprises a seating or rim formed on an outer periphery of first layers of the first pre-structure, wherein the main body comprises an intended structure to be printed;

depositing droplets of printing ink in a second printing step in order to build up an intermediate second pre-structure on at least one side of the first pre-structure;

rotating the first pre-structure and arranging the first pre-structure on a support structure in a rearrangement step between the first printing step and the second printing step;

wherein the support structure comprises a carrier substructure and a deformation-control substructure, wherein the deformation-control substructure comprises a pressure chamber;

wherein pressure in the pressure chamber is dynamically adjusted to cancel the forces deforming the first pre-structure and/or the second pre-structure;

wherein the main body closes off the pressure chamber of the deformation-control substructure;

wherein the pressure chamber is sealed off at a contact region of the first pre-structure and the carrier substructure; and wherein the three-dimensional structure is an optical component.

2. The method according to claim 1, wherein the pressure chamber is filled with a control medium.

3. The method according to claim 1, wherein the support structure comprises semi-open elements such that a dynamically adjustable pressure gradient is generated in the pressure chamber.

4. The method according to claim 1, wherein the pressure in the pressure chamber is adjusted depending on the printing data during the second printing step.

5. The method according to claim 1, wherein properties of the first pre-structure and/or the second pre-structure are measured during intermediate measurement steps and the pressure in the pressure chamber is adjusted depending on the measurement results.

6. The method according to claim 5, wherein the surface properties of at least one surface of the first pre-structure and/or the second pre-structure are determined during the intermediate measurement steps.

7. The method according to claim 6, wherein the surface properties are determined by optical measurements.

8. The method according to claim 5, wherein the first pre-structure and/or the second pre-structure comprises reference points, the location of which are measured during the intermediate measurement steps in order to determine properties of the first pre-structure and/or the second pre-structure.

9. The method according to claim 1, wherein the carrier substructure comprises a fixation means and the first pre-structure is fixed to the carrier substructure by the fixation means.

10. The method according to claim 9, wherein the fixation means comprises an electromagnetic element and the first pre-structure is fixed to the carrier substructure through electromagnetic forces.

11. The method according to claim 10, wherein orientation and/or position of the first pre-structure and/or the second pre-structure are changed through the electromagnetic element of the carrier substructure.

12. The method according to claim 9, wherein the fixation means comprises a vacuum chamber and the first pre-structure is fixed to the carrier substructure through a vacuum in the vacuum chamber.

13. The method according to claim 9, wherein the first pre-structure is released from the carrier substructure after the second printing step.

14. The method according to claim 1, wherein the first and/or second pre-structure is deformed through a targeted temperature change, in particular through heating or cooling.

* * * * *